United States Patent Office 3,835,105
Patented Sept. 10, 1974

3,835,105
METHOD FOR THE POLYMERIZATION OF VINYL CHLORIDE/VINYL ESTER COPOLYMERS AND THE HIGH BULK DENSITY COPOLYMERS OF THE PROCESS
Kurt Fendel and Johann Bauer, Burghausen, and F. Johannes Kohl, Munich, Germany, assignors to Wacker-Chemie GmbH, Munich, Germany
No Drawing. Filed Feb. 7, 1973, Ser. No. 330,315
Claims priority, application Germany, Feb. 11, 1972, P 22 06 593.6
Int. Cl. C08f 1/11, 1/60, 1/78
U.S. Cl. 260—87.1                                 10 Claims

ABSTRACT OF THE DISCLOSURE

A method of suspension polymerization of vinyl chloride/vinyl ester copolymers comprising polymerizing a monomer mixture containing at least 50% of vinyl chloride in an aqueous suspension at a pH of under 7 in the presence of 0.001% to 3% by weight, based on the monomers, of a monomer-soluble free-radical-forming polymerization catalyst, from 0.01% to 2% by weight based on the monomers, of water-soluble cellulose ethers as protective colloids, and from 2% to 20% by weight, based on the monomers, of an organic solvent having from 3 to 8 carbon atoms selected from the group consisting of alkyl alkanoates, alkanones and alkanediones and recovering a copolymer powder having a higher bulk density and improved flow properties.

THE PRIOR ART

It is known to produce copolymers of vinyl chloride in aqueous suspension by means of oil-soluble free-radical formers. The use of protective colloids which effect a corresponding fine distribution of the monomers in droplets and which prevent the polymer particles from sticking together, is recommended, as for example, the cellulose ethers. In this known suspension polymerization process, copolymers of vinyl chloride are obtained in fine grained form, which copolymers can be readily separated from the aqueous phase by filtration and dried subsequently. The powders thus obtained can be processed thermoplastically or lacquers can be produced therefrom by their dissolution in suitable organic solvents.

A disadvantage of thermoplastic processing is that these copolymers have a relatively low bulk density and that the flow properties of the powder, which influences the feeding capacity into the conveyor screws and thus the processing rate, is not sufficient. Particularly when using catalysts with a low half-life value, the so-called quick action catalysts, such as acetylcyclohexanesulfonyl peroxide, peresters and percarbonates, products are obtained with very low bulk densities.

Furthermore it is a disadvantage in the production of lacquers that the copolymers so produced do not dissolve clearly in the usual solvents.

OBJECTS OF THE INVENTION

An object of the present invention is the obtaining of suspension polymerized copolymers of vinyl chloride having higher bulk densities and improved flow properties.

A further object of the present invention is the development of a method for the suspension polymerization of vinyl chloride copolymers which consists essentially of heating a monomer mixture of (a) from 50% to 95% by weight of the monomer mixer of vinyl chloride, (b) from 3% to 50% by weight of the monomer mixture of a vinyl alkanoate having from 4 to 16 carbon atoms, and (c) from 0 to 10% by weight, based on the weight of (a) and (b) above, of unsaturated carboxylates selected from the group consisting of alkenoic acids having 3 to 6 carbon atoms, alkenedioic acids having 4 to 6 carbon atoms and esters thereof with alkanols having 1 to 8 carbon atoms, in an aqueous media at a pH of under 7, in the presence of 0.001% to 3% by weight, based on the monomers, of a monomer-soluble free-radical-forming polymerization catalyst, from 0.01% to 2% by weight, based on the monomers, of water-soluble cellulose ethers as protective colloids and from 2% to 20% by weight, based on the monomers, of an organic solvent having from 3 to 8 carbon atoms selected from the group consisting of alkyl alkanoates, alkanones and alkanediones for a time and a temperature sufficient to effect polymerization, and recovering a copolymer powder having a higher bulk density and improved flow properties.

These and other objects of the present invention will become more apparent as the description thereof proceeds.

DESCRIPTION OF THE INVENTION

The above objects have been achieved and the drawbacks of the prior art have been avoided by the newly discovered method for the production of copolymers from 50% to 97% by weight of vinyl chloride and 3% to 50% by weight of vinyl esters in the aqueous phase in the presence of oil-soluble free-radical formers, water-soluble protective colloids, and organic solvents. The method is characterized in that the protective colloids are from 0.01% to 2% by weight, based on the monomer, of cellulose ether, while, as organic solvents, 2% to 20% by weight, based on the monomer, of esters or ketones are utilized and that the polymerization is effected at a pH-value of under 7.

It was found surprisingly that the products obtained with the claimed combination of measures have a higher bulk density and improved flow properties.

More particularly, the invention comprises a method for the suspension polymerization of vinyl chloride copolymers which consists essentially of heating a monomer mixture of (a) from 50% to 95% by weight of the monomer mixture of vinyl chloride, (b) from 3% to 50% by weight of the monomer mixture of a vinyl alkanoate having from 4 to 16 carbon atoms, and (c) from 0 to 10% by weight, based on the weight of (a) and (b) above, of unsaturated carboxylates selected from the group consisting of alkenoic acids having 3 to 6 carbon atoms, alkenedioic acids having 4 to 6 carbon atoms and esters thereof with alkanols having 1 to 8 carbon atoms, in an aqueous media at a pH of under 7, in the presence of 0.001% to 3% by weight, based on the monomers, of a monomer-soluble free-radical-forming polymerization catalyst, from 0.01% to 2% by weight, based on the monomers, of water-soluble cellulose ethers as protective colloids and from 2% to 20% by weight, based on the monomers, of an organic solvent having from 3 to 8 carbon atoms selected from the group consisting of alkyl alkanoates, alkanones and alkanediones for a time and a temperature sufficient to effect polymerization, and recovering a copolymer powder having a higher bulk density and improved flow properties.

The water-soluble cellulose ethers utilized as protective colloids according to the invention are, for example, methyl cellulose, hydroxyethyl cellulose, hydroxypropyl cellulose, methylhydroxyethyl cellulose, methylhydroxypropyl cellulose, carboxymethyl cellulose, and mixtures thereof.

The ester or ketone organic solvents utilized according to the invention are preferably alkyl alkanonates, alkanones and alkanediones, all having 3 to 8 carbon atoms, such as esters from alkanoic acids having 2 to 4 carbon atoms and alkanols having 1 to 4 carbon atoms and ketones such as alkanones having 3 to 6 carbon atoms and alkanediones having 5 to 6 carbon atoms. Examples of the esters are methyl acetate, ethyl acetate, n-butyl acetate and methyl propionate. The acetic acid esters are preferable. Examples of the ketones are acetone, methylethyl ketone, methylpropyl ketone, methylisobutyl ketone, and of the diketones are acetylacetone.

The polymerization is effected at a pH of under 7, preferably in the acid region of pH's between 2 and 6. Ordinarily no control of the pH is required. The pressure of the polymerization is ordinarily maintained between 4 and 10 atmospheres and the reaction temperature is ordinarily maintained between 50° C. and 80° C.

The vinyl esters utilized are esters of saturated carboxylic acids with 2 to 14, preferably 2 to 4, carbon atoms, that is, vinyl alkanoates having from 4 to 16 carbon atoms, preferably from 4 to 6 carbon atoms, taking into account the two carbon atoms of the vinyl group. Particularly preferable as the vinyl ester is vinyl acetate. Examples of the other vinyl esters used are, for example, vinyl propionate, vinyl butyrate, vinyl 2-ethylhexanoate, vinyl laurate and vinyl "versatate." ("Versatic" acid is a registered trademark for mixtures of straight and branched alkanoic acids.)

Furthermore, it is frequently of advantage to add unsaturated carboxylic acids or their esters in amounts of from 1% to 10% by weight, based on the total amount of vinyl chloride and vinyl ester, to these monomers. Examples of such compounds are the alkenoic acids having 3 to 6 carbon atoms, such as acrylic acid, methacrylic acid, etc.; the alkenedioic acids having 4 to 6 carbon atoms such as fumaric acid, maleic acid, etc.; and their mono and diesters with alkanols having 1 to 8 carbon atoms such as ethyl acrylate, diethyl maleate, etc.

The monomers can all be charged at the start of the polymerization. For obtaining easily soluble products, however, it is of advantage to dose in the monomers partly during the polymerization. Frequently up to 90% by weight of the monomers are added continuously after commencement of polymerization.

All monomer-soluble free-radical formers generally used for the suspension polymerization of vinyl chloride are also used within the framework of the method of the present invention. Examples of such catalysts are, for example, diarylperoxides, diacylperoxides, such as diacetylperoxide, acetylbenzoylperoxide, dilauroylperoxide, dibenzoylperoxide, bis-2,4 - dichlorobenzoylperoxide; dialkylperoxides, such as di-t-butylperoxide; peresters, such as isopropyl peracetate, t-butyl peracetate, t-butyl peroctoate, t-butyl perpivalate; dialkyl peroxydicarbonates, such as diisopropyl peroxydicarbonate, dihexyl peroxydicarbonate, dicyclohexyl peroxydicarbonate, diethylhexyl peroxydicarbonate, ethylcyclohexyl peroxydicarbonate, dicetyl peroxydicarbonate; mixed anhydrides of organic sulfo-peracids, and organic acids, such as acetyl cyclohexylsulfonyl peroxide; as well as azo compounds known as polymerization catalysts, such as azoisobutyric dinitrile; and boroalkyls. The catalysts can be used individually or as mixtures, as for example, mixtures of dialkyl percarbonates and lauroyl peroxide or acetyl cyclohexyl sulfonyl peroxide with azoisobutyric nitrile. The amounts utilized are generally from 0.001% to 3% by weight, preferably from 0.01% to 0.3% by weight, based on the weight of the monomer. The catalysts can be charged either with the monomers or be added during the polymerization.

In addition, known polymerization aids can be added to the polymerization recipe, for example, molecular weight regulators, such as aliphatic aldehydes with 2 to 4 carbon atoms, chlorinated hydrocarbons, such as di- and trichloroethylene, chloroform, methylene chloride; mercaptans and propylene as well as isobutylene.

It is also possible to use additionally emulsifiers in small amounts. The monomer-water ratio is not of decisive importance. As a rule the amount of monomer is between 10% and 50% of the total amount of water and monomer. Water can be dosed in, in addition, during the reaction.

The polymerization is carried out in closed vessels and generally under autogenous pressure of the monomers. The reaction vessel contains a stirrer and mostly baffle plates or spoilers to ensure intensive stirring. In addition, the reaction vessel is equipped with the necessary dosing devices. As a rule jacketed cooling autoclaves are used so that intensive cooling is ensured. The attachment of a reflux condenser to improve the cooling is likewise possible.

The following examples are illustrative of the practice of the invention without being limitative.

EXAMPLES

The following examples show the weight by volume of the polymers indicated in the form of tap densities. To this end 100 gm. of product are charged in a graduated cylinder of a tapping volumeter (Tap-pak Volumeter) of J. Engelmann, A.G., and tapped 1,000 times with a 3 mm. stroke. The volume after the tapping is read and converted to gm./liter (tap density).

The flow properties were determined by determining the time in seconds in which 700 gm. of product flow from a glass funnel with a cut-off outlet tube. The diameter of the outlet port was 17 mm.

Example 1

A pressure-resistant pipe of stainless steel was charged with 750 gm. of water, 1.5 gm. of hydroxyethyl cellulose ("Cellosize WP 4400") and 0.4 gm. of dilauroyl peroxide. After evacuation to 0.5 atmospheres, 65 gm. of vinyl acetate and 310 gm. of vinyl chloride were added thereto.

The pipe was then rotated lengthwise in a water-bath at 64° C. for 22 hours. After this time, a reaction of about 90% by weight had been achieved. The product was filtered off, washed and dried.

The polymer had a tap density of 610 gm./liter. The rate of flow was 17 sec.

If the same polymerization recipe is employed utilizing in addition 11.25 gm. of acetone (3% by weight, based on the weight of the monomer mixture), a product was obtained with a tap density of 620 gm./liter and a rate of flow of 14 sec.

When the polymerization was repeated with 5% by weight, based on the monomer mixture, of acetone, the resulting copolymer had a tap density of 620 gm./liter and a rate of flow of 13 sec.

When the polymerization was repeated with 10% by weight, based on the monomer mixture, of acetone, the resulting copolymer had a tap density of 700 gm./liter and a rate of flow of 12 sec.

Example 2

The polymerization of Example 1 was repeated, with the exception that 0.2 gm. of diisopropyl peroxydicarbonate was used as a catalyst instead of 0.4 gm. of dilauroyl peroxide.

A product was obtained with a tap density of 560 gm./liter and a rate of flow of 15 sec.

By adding acetone to the polymerization recipe, the following values were obtained:

| Acetone (percent by weight) based on the monomer mixture | Tap density (gm./liter) | Rate of flow (sec.) |
| --- | --- | --- |
| 3 | 630 | 13 |
| 5 | 700 | 13 |
| 10 | 780 | 11 |

Example 3

The procedure was the same as in Example 1. However, the organic solvent was butyl acetate.

| Butyl acetate (percent by weight) based on the monomer mixture | Tap density (gm./liter) | Rate of flow (sec.) |
|---|---|---|
| 0 | 610 | 17 |
| 3 | 740 | 13 |
| 5 | 750 | 13 |
| 10 | 730 | 13 |

Example 4

Similar to Example 2 (diisopropyl peroxydicarbonate as a catalyst), but with butyl acetate as solvent.

| Butyl acetate (percent by weight) based on the monomer mixture | Tap density (gm./liter) | Rate of flow (sec.) |
|---|---|---|
| 0 | 560 | 15 |
| 3 | 670 | 13 |
| 5 | 770 | 13 |
| 10 | 770 | 11 |

Example 5

Similar to Example 1 (dilauroyl peroxide as a catalyst). Methylethyl ketone was used as the organic solvent.

| Methylethyl ketone (percent by weight) based on the monomer mixture | Tap density (gm./liter) | Rate of flow (sec.) |
|---|---|---|
| 0 | 610 | 17 |
| 3 | 650 | 15 |
| 5 | 680 | 15 |
| 10 | 770 | 12 |

Example 6

Similar to Example 2 (diisopropyl peroxydicarbonate as a catalyst). Methylethyl ketone was used as the organic solvent.

| Methylethyl ketone (percent by weight) based on the monomer mixture | Tap density (gm./liter) | Rate of flow (sec.) |
|---|---|---|
| 0 | 560 | 15 |
| 3 | 690 | 14 |
| 5 | 640 | 15 |
| 10 | 760 | 12 |

Example 7

The following ingredients were charged into a stirring autoclave of 100 liter capacity:

60.0 kg. of fully deionized water
0.12 kg. of hydroxyethyl cellulose ("Cellosize WP 4400")
7.5 gm. of diisopropyl peroxydicarbonate and, after evacuation for 30 minutes:

5.0 kg. of vinyl acetate, and
25.0 kg. of vinyl chloride.

The contents of the autoclave were brought under stirring (stirrer speed 200 r.p.m.) to a temperature of 65° C. The polymerization was completed after 5 hours. The reaction was about 90% by weight. The product was filtered off, washed three times with fully deionized water and dried. The product had the following properties:

| Tap density (gm./liter) | Rate of flow (sec.) |
|---|---|
| 680 | 24 |

When ethyl acetate was added to the batch prior to the polymerization, products with the following properties were obtained.

| Ethyl acetate (percent by weight) based on the monomer mixture | Tap density (gm./liter) | Rate of flow (sec.) |
|---|---|---|
| 3 | 710 | 18 |
| 5 | 770 | 14 |
| 10 | 820 | 13 |

Example 8

This example describes the copolymerization of vinyl chloride and vinyl acetate by dosing in the monomer during the reaction. The addition of solvent increases not only the tap density and the flow properties, but also the solubility of the copolymer in organic solvents, such as ethyl acetate, is also considerably improved.

The following polymerization recipe was charged into a 100 liter stirring autoclave:

60.0 kg. of fully deionized water
0.12 kg. of hydroxyethyl cellulose ("Cellosize WP 4000")
30.0 gm. of isopropyl peroxydicarbonate.

The autoclave was then closed and a vacuum applied until the pressure was 0.5 atmospheres. The autoclave was then further filled with:

1.5 kg. of vinyl acetate, and
4.5 kg. of vinyl cholride.

The mixture was then heated under stirring to 65° C., after which polymerization commenced. After the pressure had dropped in the autoclave to 4.2 atmospheres, a mixture of:

3.5 kg. of vinyl acetate, and
20.5 kg. of vinyl chloride was continuously pumped under constant pressure into the autoclave. After the addition of the monomer was completed, the pressure was allowed to return to 1.5 atmospheres when the polymerization was finished. The balance of the unreacted monomer was distilled off. An aqueous suspension of the copolymer was obtained which was filtered off, washed with water and dried. The yield is about 94% by weight.

The product had a tap density of 510 mg./liter. The rate of flow was 30 seconds. The product issued from the funnel only under repeated tapping. A 20% solution of the product in ethyl acetate (dissolved for 24 hours at 20° C.) was turbid and had many undissolved floccules.

The same polymerization with the addition of methyl acetate yielded the following results:

| Methyl acetate (percent by weight per 100 parts of monomer) | Tap density (gm./liter) | Rate of flow (sec.) | 20% solution in ethyl acetate |
|---|---|---|---|
| 0 | 510 | 30 | Turbid, flocculent. |
| 5 | 670 | 22 | Do. |
| 10 | 810 | 12 | Turbid. |
| 15 | 820 | 15 | Clear. |

The preceding specific embodiments are illustrative of the practice of the invention. It is to be understood, however, that other expedients known to those skilled in the art, or disclosed herein, may be employed without departing from the spirit of the invention or the scope of the appended claims.

We claim:

1. A method for the suspension polymerization of vinyl chloride copolymers which consists essentially of heating a monomer mixture of (a) from 50% to 95% by weight of the monomer mixture of vinyl chloride, (b) from 3% to 50% by weight of the monomer mixture of a vinyl alkanoate having from 4 to 16 carbon atoms, and (c) from 0 to 10% by weight, based on the weight of (a) and (b) above, of unsaturated carboxylates selected from the group consisting of alkenoic acids having 3 to 6 carbon atoms, alkenedioic acids having 4 to 6 carbon atoms and esters thereof with alkanols havin 1 to 8 carbon atoms, in an aqueous media at a pH of under 7, in the presence of 0.001% to 3% by weight, based on the monomers, of a monomer-soluble free-radical-forming polymerization catalyst, from 0.01% to 2% by weight, based on the monomers, of water-soluble cellulose ethers as protective colloids and from 2% to 20% by weight, based on the monomers, of an organic solvent having from 3 to 8 carbon atoms selected from the group consisting of alkyl alkanoates, alkanones and alkanediones for a time and a temperature sufficient to effect polymerization, and recovering a copolymer powder having a higher bulk density and improved flow properties.

2. The method of claim 1 wherein said unsaturated carboxylates are present in an amount of from 1% to 10% by weight based on the weight of said (a) and (b).

3. The method of claim 1 wherein a part of said monomer mixture is added after said temperature is attained.

4. The method of claim 3 wherein up to 90% of said monomer mixture is added after said temperature is attained.

5. The method of claim 1 wherein said monomer mixture is less than 50% by weight of said monomer mixture plus water.

6. The method of claim 1 wherein said organic solvent is an alkyl alkanoate having from 3 to 8 carbon atoms derived from an alkanoic acid having from 2 to 4 carbon atoms and an alkanol having from 1 to 4 carbon atoms.

7. The method of claim 6 wherein said alkanoic acid is acetic acid.

8. The method of claim 6 wherein said alkyl alkanoate is butyl acetate.

9. The method of claim 1 wherein said organic solvent is an alkanone having from 3 to 6 carbon atoms.

10. The method of claim 1 wherein said organic solvent is an alkanedione having from 5 to 6 carbon atoms.

References Cited

UNITED STATES PATENTS 3,062,765  11/1962  Sherman et al. _____ 260—29.6
3,509,109   4/1970  Buning et al. _____ 260—78.5

STANFORD M. LEVIN, Primary Examiner

U.S. Cl. X.R.

260—78.5 R, 78.5 UA, 80.8